US012412562B2

(12) United States Patent
Guan et al.

(10) Patent No.: US 12,412,562 B2
(45) Date of Patent: Sep. 9, 2025

(54) SYSTEMS AND METHODS TO IMPROVE TRUST IN CONVERSATIONS

(71) Applicant: Accenture Global Solutions Limited, Dublin (IE)

(72) Inventors: Lan Guan, New York, NY (US); Neeraj D Vadhan, Los Altos, CA (US); Guanglei Xiong, Pleasanton, CA (US); Anwitha Paruchuri, San Jose, CA (US); Sukryool Kang, Dublin, CA (US); Sujeong Cha, Long Island City, NY (US); Anupam Anurag Tripathi, Chicago, IL (US); Thomas Wayne Hancock, Oklahoma City, OK (US); Jill Gengelbach-Wylie, Austin, TX (US); Jayashree Subrahmonia, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 611 days.

(21) Appl. No.: 17/732,944

(22) Filed: Apr. 29, 2022

(65) Prior Publication Data
US 2023/0352003 A1    Nov. 2, 2023

(51) Int. Cl.
*G10L 15/22*    (2006.01)
*G06F 40/169*   (2020.01)
(Continued)

(52) U.S. Cl.
CPC .......... *G10L 15/063* (2013.01); *G06F 40/169* (2020.01); *G06F 40/20* (2020.01); *G06N 20/00* (2019.01); *G10L 15/02* (2013.01); *G10L 15/16* (2013.01); *G10L 15/22* (2013.01); *G06T 13/205* (2013.01); *G10L 25/18* (2013.01); *G10L 25/30* (2013.01)

(58) Field of Classification Search
None
See application file for complete search history.

(56) References Cited

U.S. PATENT DOCUMENTS 9,977,778 B1 *  5/2018  Perez ................. G06F 16/3329
10,510,010 B1 * 12/2019  Walker ................ G06N 3/006
(Continued)

OTHER PUBLICATIONS

Intellectually Property Office of India, First Examination Report issued in India Patent Application No. 202344028526, Apr. 2, 2025, 8 pages.

*Primary Examiner* — Richard Z Zhu
(74) *Attorney, Agent, or Firm* — POLSINELLI PC

(57) ABSTRACT

The present disclosure relates to a system, a method, and a product for using machine learning models to quantify and/or improve trust in conversations. The system includes a non-transitory memory; and a processor in communication with the non-transitory memory. The processor executes the instructions to cause the system to: obtain a set of vocal features and a set of text features for each sample in audio samples; obtain a trust score for each sample; perform a preprocess to obtain a set of input features for each sample; determine a type of machine-learning algorithm for the machine-learning network; tune a set of hyper parameters for the machine-learning network; generate a predicated trust score by the machine-learning network with the sets of input features for each sample; and train the machine-learning network based on the predicated trust score and the trust score for each sample to obtain the training result.

17 Claims, 11 Drawing Sheets

(51) Int. Cl.
  *G06F 40/20*   (2020.01)
  *G06N 20/00*   (2019.01)
  *G10L 15/02*   (2006.01)
  *G10L 15/06*   (2013.01)
  *G10L 15/16*   (2006.01)
  *G06T 13/20*    (2011.01)
  *G10L 25/18*    (2013.01)
  *G10L 25/30*    (2013.01)

(56) References Cited

U.S. PATENT DOCUMENTS

| | | | | |
|---|---|---|---|---|
| 10,839,335 | B2 * | 11/2020 | Weisman | G06N 20/00 |
| 11,011,154 | B2 * | 5/2021 | Yang | G10L 13/02 |
| 11,366,857 | B2 * | 6/2022 | Rodriquez | H04M 3/5183 |
| 11,593,646 | B2 * | 2/2023 | Soyer | G06N 3/006 |
| 11,694,674 | B1 * | 7/2023 | Abbas | G10L 13/08 |
| | | | | 704/260 |
| 12,061,964 | B2 * | 8/2024 | Schaul | G06F 18/2415 |
| 12,067,006 | B2 * | 8/2024 | Singh | G06N 3/08 |
| 12,087,275 | B2 * | 9/2024 | Stanton | G06N 3/08 |
| 2003/0167167 | A1 * | 9/2003 | Gong | G10L 15/22 |
| | | | | 704/250 |
| 2019/0238535 | A1 * | 8/2019 | Lew | G10L 17/04 |
| 2020/0043504 | A1 | 2/2020 | Li et al. | |
| 2020/0065334 | A1 * | 2/2020 | Rodriguez | G06F 40/35 |
| 2022/0028367 | A1 * | 1/2022 | Shekhar | G10L 13/047 |
| 2022/0116388 | A1 | 4/2022 | Johnson et al. | |
| 2022/0383329 | A1 * | 12/2022 | Manderscheid | H04M 3/5175 |
| 2023/0274168 | A1 * | 8/2023 | Colbert | G06N 3/0985 |
| | | | | 706/11 |

* cited by examiner

SYSTEMS AND METHODS TO IMPROVE TRUST IN CONVERSATIONS

TECHNICAL FIELD

This disclosure relates to machine learning and artificial intelligence (AI), and is particularly directed to systems and methods for scoring trust scores and/or improving trust in conversations.

BACKGROUND

Trust is essential to build meaningful business and personal relationships, especially during a live conversation. A trustworthy conversation promotes customer satisfaction and business outcome for sales, marketing and service applications. However, trust is not straightforward to quantify previously because there is no well-established standard to perceive or measure this psychologic property present in interpersonal relationships. Therefore, trust assessment is largely based on subjective ratings and it's difficult to compare trust delivery among individuals/teams and track its improvement over time.

Over the past decade, machine learning/artificial intelligence (AI) has evolved at a very noticeable pace. Machine learning is dependent on building complex machine models and/or system. The machine learning models may be based on machine-learning algorithms, and may include a plurality of hyper-parameters for the machine learning architecture, the machine learning training, and machine learning evaluation.

SUMMARY

The present disclosure describes various embodiment of systems, methods, and/or products using machine learning models to quantify and improve trust in conversations between two or more participants using new artificial intelligence and behavior sciences techniques. An objective, reproducible, and automated system/method for trust management in conversations is disclosed, which advances the technology or technical fields of machine learning and/or artificial intelligence.

The present disclosure describes a system for using machine learning models to quantify and/or improve trust in conversations. The system includes a non-transitory memory storing instructions executable to construct a machine-learning network to quantify a trust score; and a processor in communication with the non-transitory memory. The processor executes the instructions to cause the system to: obtain a set of vocal features and a set of text features for each sample in audio samples; obtain a trust score for each sample; perform a preprocess on the set of vocal features and the set of text features to obtain a set of input features for each sample; determine a type of machine-learning algorithm for the machine-learning network based on a training result of the machine-learning network; tune a set of hyper parameters for the machine-learning network based on a cross validation according to the machine-learning network; generate a predicated trust score by the machine-learning network with the sets of input features for each sample; and train the machine-learning network based on the predicated trust score and the trust score for each sample to obtain the training result.

The present disclosure also describes a method for using machine learning models to quantify and/or improve trust in conversations. The method include obtaining, by a computing device comprising a memory storing instructions executable to construct a machine-learning network to quantify a trust score and a processor in communication with the memory, a set of vocal features and a set of text features for each sample in audio samples; obtaining, by the computing device, a trust score for each sample; performing, by the computing device, a preprocess on the set of vocal features and the set of text features to obtain a set of input features for each sample; determining, by the computing device, a type of machine-learning algorithm for the machine-learning network based on a training result of the machine-learning network; tuning, by the computing device, a set of hyper parameters for the machine-learning network based on a cross validation according to the machine-learning network; generating, by the computing device, a predicated trust score by the machine-learning network with the sets of input features for each sample; and training, by the computing device, the machine-learning network based on the predicated trust score and the trust score for each sample to obtain the training result.

The present disclosure further describes a product for using machine learning models to quantify and/or improve trust in conversations. The product includes machine-readable media other than a transitory signal; and instructions stored on the machine-readable media for constructing a machine-learning network to quantify a trust score. When a processor executes the instructions, the product is configured to: obtain a set of vocal features and a set of text features for each sample in audio samples; obtain a trust score for each sample; perform a preprocess on the set of vocal features and the set of text features to obtain a set of input features for each sample; determine a type of machine-learning algorithm for the machine-learning network based on a training result of the machine-learning network; tune a set of hyper parameters for the machine-learning network based on a cross validation according to the machine-learning network; generate a predicated trust score by the machine-learning network with the sets of input features for each sample; and train the machine-learning network based on the predicated trust score and the trust score for each sample to obtain the training result.

The present disclosure also describes a system including circuitry configured to implement any of the above methods.

The present disclosure also describes a non-transitory computer-readable storage medium storing computer-readable instructions. The computer-readable instructions, when executed by a processor, are configured to cause the processor to perform any of the above systems and methods.

DETAILED DESCRIPTION

Figure 1:
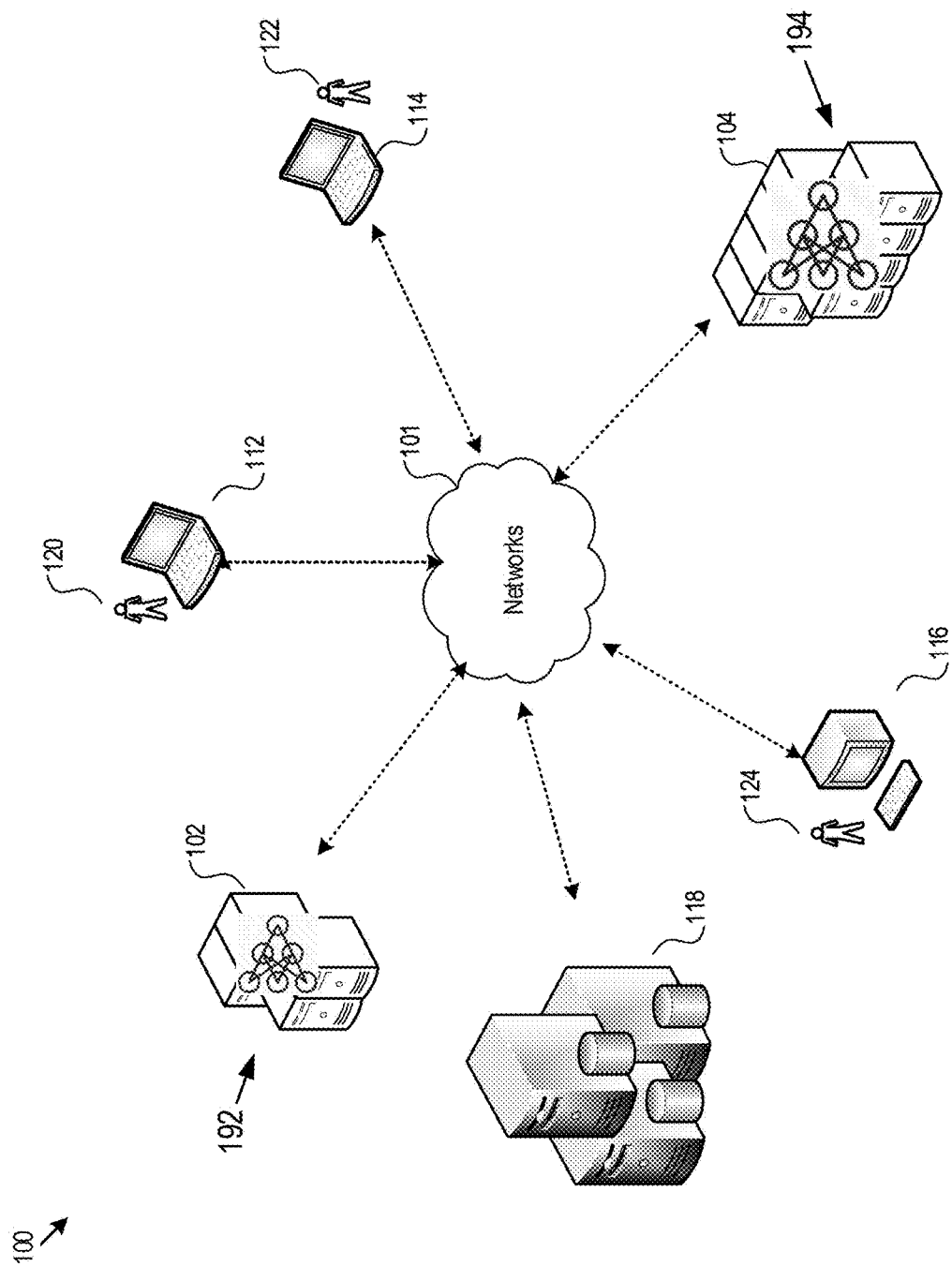
FIG. 1 shows an exemplary electronic communication environment for implementing a trust quantification and management system.

The disclosure will now be described hereinafter with reference to the accompanied drawings, which form a part of the present disclosure, and which show, by way of illustration, specific examples of embodiments. Please note that the disclosure may, however, be embodied in a variety of different forms and, therefore, the covered or claimed subject matter is intended to be construed as not being limited to any of the embodiments set forth herein. Please also note that the disclosure may be embodied as methods, devices, components, or systems. Accordingly, embodiments of the disclosure may, for example, take the form of hardware, software, firmware or any combination thereof.

Throughout the specification and claims, terms may have nuanced meanings suggested or implied in context beyond an explicitly stated meaning. Likewise, the phrase "in one embodiment" or "in one implementation" as used herein does not necessarily refer to the same embodiment or implementation and the phrase "in another embodiment" or "in another implementation" as used herein does not necessarily refer to a different embodiment or implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Trust is essential to build meaningful business and personal relationships, especially during a live conversation. A trustworthy conversation promotes customer satisfaction and business outcome for sales, marketing and service applications. In today's business world, customers take good service with a certain trust for granted. However, trust is not straightforward to quantify previously for multiple reasons. One of the reasons may be that there is no standard to perceive or measure this psychologic property present in interpersonal relationships. Therefore, trust assessment is largely based on subjective ratings and it's difficult to compare trust delivery among individuals/teams and track its improvement over time. For example, customer service call success data indicates that standardizing agent performance may be an important factor for strengthening customer trust; and/or social media may have different level and progression of customer satisfaction and there may be room for improvement.

The present disclosure describes various embodiments of systems and methods to quantify and/or improve trust in conversations between two or more participants using new artificial intelligence and behavior sciences techniques. In various embodiments, textual and/or audio data may be used as input for trust quantification. Various embodiments in the present disclosure may be extendable to visual input when video data is available.

Some embodiments include a system to quantify trust perception and improve trust delivery in conversations. The system may include one, more, or all of the following components. A measurement component may obtain questionnaire-based rating of trust perception using behavior science. A score component may perform machine learning-based scoring of trust delivery using, for example, textual and voice features. A recommendation component may provide personalized coaching using AI-based training recommendations. An Automation component may include a realistic digital avatar trained with high trust standard.

Various embodiments in the present disclosure may accurately and/or automatically predict trust scores to provide live or post-call evaluations. In one implementation, using the prediction, trust may be scored for a participant over time or averaged among a group for comparison. In another implementation, their trust delivery may be improved by taking the recommended trainings designed to address the component affecting the overall score. In another implementation, to further provide automation, one participant may be replaced by a digital avatar, which is capable of delivering trustworthy interactions in any situation.

The present disclosure provides an objective, reproducible, and automated method/system for trust management in conversations. In some embodiments, similar techniques described in the present disclosure may be applied to quantify and/or manage other psychologic factors related to human perception, for example and not limited to, fairness, safety, stress, interest, etc.

FIG. 1 shows an exemplary electronic communication environment 100 in which a trust quantification and management system or any other system described in the present disclosure may be implemented. The electronic communication environment 100 may include one or more servers (102 and 104) including one or more machine-learning network (e.g., 192 and/or 194), one or more user devices (112, 114, and 116) associated with users (120, 122, and 124), and one or more databases 118, in communication with each other via public or private communication networks 101.

The server 102 may be implemented as a central server or a plurality of servers distributed in the communication networks. While the server 102 shown in FIG. 1 is implemented as a single server, the server 102 may be implemented as a group of distributed servers, or may be distributed on the server 104.

The user devices 112, 114, and 116 may be any form of mobile or fixed electronic devices including but not limited to desktop personal computer, laptop computers, tablets, mobile phones, personal digital assistants, and the like. The user devices 112, 114, and 116 may be installed with a user interface for accessing the trust quantification and management system or any other system described in the present disclosure. The one or more database 118 of FIG. 1 may be hosted in a central database server, a plurality of distributed database servers, or in cloud-based database hosts. The database 118 may be organized and implemented in any form, including but not limited to relational database containing audio data, text data, graphic data, video data, or the like. The database 118 may be configured to store the intermediate data and/or final results for implementing the trust quantification and management system.

Figure 2:
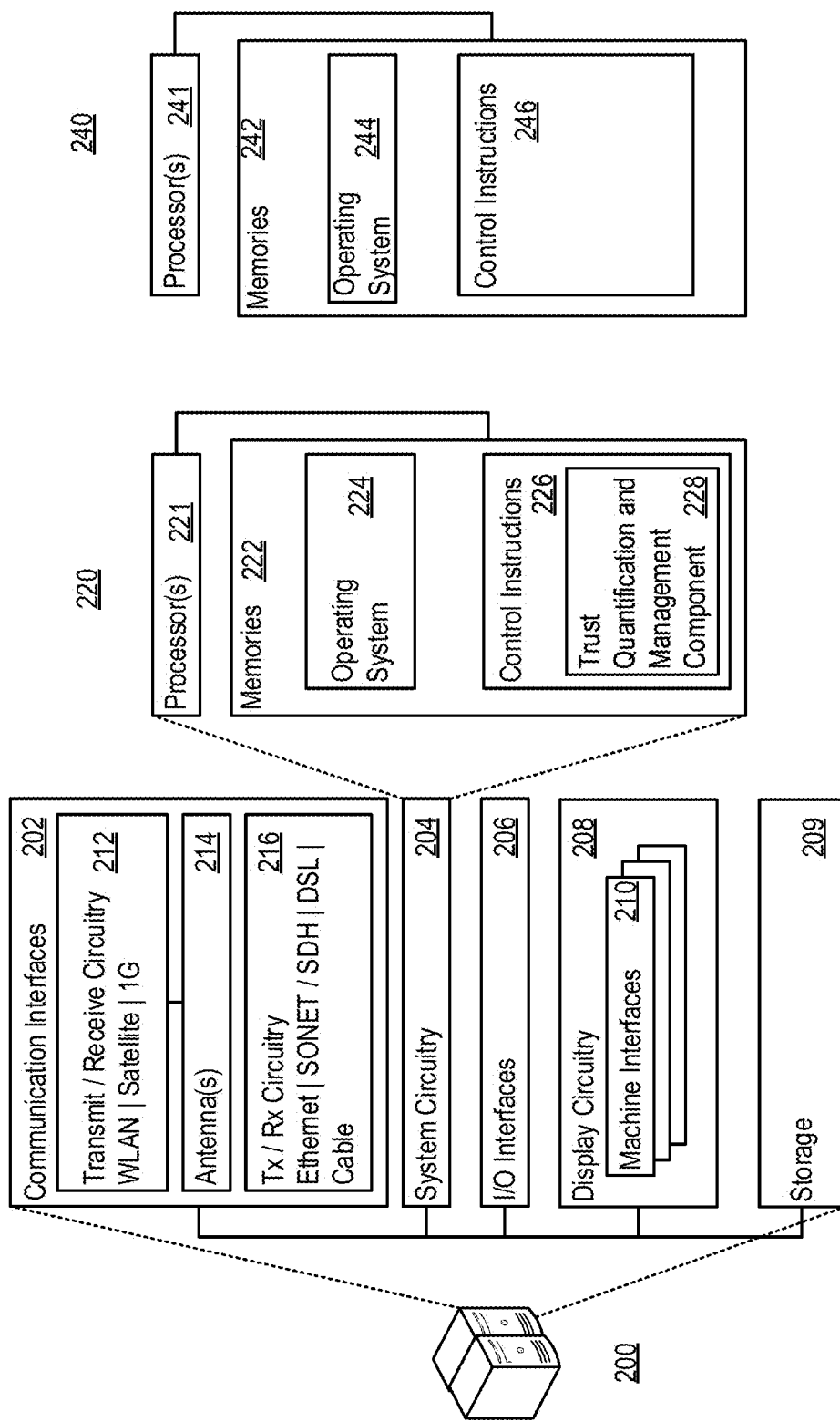
FIG. 2 shows computer systems that may be used to implement various components of the electronic communication environment of FIG. 1.

FIG. 2 shows an exemplary system, which is a computer system 200 for implementing the server 102 or the user devices 112, 114, and 116. The computer system 200 may include communication interfaces 202, system circuitry 204, input/output (I/O) interfaces 206, storage 209, and display circuitry 208 that generates machine interfaces 210 locally or for remote display, e.g., in a web browser running on a local or remote machine. The machine interfaces 210 and the I/O interfaces 206 may include GUIs, touch sensitive displays, voice or facial recognition inputs, buttons, switches, speakers and other user interface elements. Additional examples of the I/O interfaces 206 include microphones, video and still image cameras, headset and microphone input/output jacks, Universal Serial Bus (USB) connectors, memory card slots, and other types of inputs. The I/O interfaces 206 may further include magnetic or optical media interfaces (e.g., a CDROM or DVD drive), serial and parallel bus interfaces, and keyboard and mouse interfaces.

The communication interfaces 202 may include wireless transmitters and receivers ("transceivers") 212 and any antennas 214 used by the transmitting and receiving circuitry of the transceivers 212. The transceivers 212 and antennas 214 may support Wi-Fi network communications, for instance, under any version of IEEE 802.11, e.g., 802.11n or 802.11ac. The communication interfaces 202 may also include wireline transceivers 216. The wireline transceivers 116 may provide physical layer interfaces for any of a wide range of communication protocols, such as any type of Ethernet, data over cable service interface specification (DOCSIS), digital subscriber line (DSL), synchronous optical network (SONET), or other protocol.

The storage 209 may be used to store various initial, intermediate, or final data or model for implementing the trust quantification and management system. These data corpus may alternatively be stored in the database 118 of FIG. 1. In one implementation, the storage 209 of the computer system 200 may be integral with the database 118 of FIG. 1. The storage 209 may be centralized or distributed, and may be local or remote to the computer system 200. For example, the storage 209 may be hosted remotely by a cloud computing service provider.

The system circuitry 204 may include hardware, software, firmware, or other circuitry in any combination. The system circuitry 204 may be implemented, for example, with one or more systems on a chip (SoC), application specific integrated circuits (ASIC), microprocessors, discrete analog and digital circuits, and other circuitry.

For example, at least some of the system circuitry 204 may be implemented as processing circuitry 220 for the server 102 of FIG. 1. The processing circuitry 220 may include one or more processors 221 and memories 222. The memories 222 stores, for example, control instructions 226 and an operating system 224. The control instructions 226, for example may include instructions for implementing the components 228 of a trust quantification and management system. In one implementation, the instruction processors 221 execute the control instructions 226 and the operating system 224 to carry out any desired functionality related to trust quantification and management.

Alternatively, or in addition, at least some of the system circuitry 204 may be implemented as client circuitry 240 for the user devices 112, 114, and 116 of FIG. 1. The client circuitry 240 of the user devices may include one or more instruction processors 241 and memories 242. The memories 242 stores, for example, control instructions 246 and an operating system 244. In one implementation, the instruction processors 241 execute the control instructions 246 and the operating system 244 to carry out any desired functionality related to the user devices.

Figure 3A:
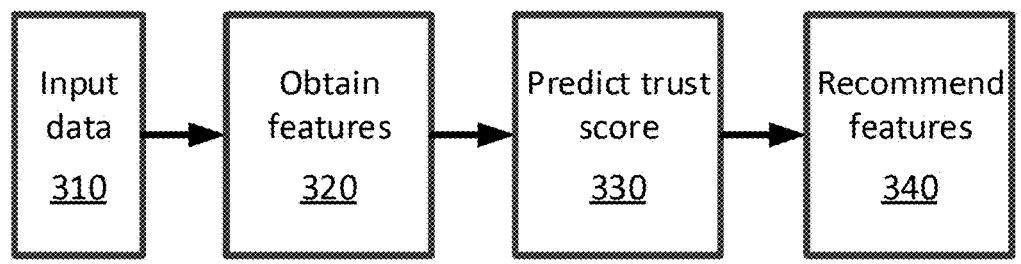
FIG. 3A shows a schematic diagram of an embodiment of the present disclosure.

FIG. 3A shows an example of a trust quantification and management system 300 to predict trust score based on input data 310 and/or recommend features for improving trust scores for a user. The trust quantification and management system 300 may include a portion or all of the following: a component 320 to obtain features based on the input data 310, a component 330 to predict trust score for the input data, and/or a component 340 to recommend a list of features for a user to improve trust scores.

In some implementations, the input data 310 may be audio data only or a combination of audio data and text data. In some implementations, the component 320 may include a machine-learning network (or machine-learning module), and/or the obtained feature by the component 320 may be a combination of vocal features and text features. In some implementations, the component 330 may include a machine-learning network (or machine-learning module), and/or the predicted trust score by the component 330 may be a predicated score for the input data (e.g., audio data) 310. In some implementations, the component 340 may include a machine-learning network (or machine-learning module), and/or the recommended features by the component 340 may be used for a user (or a group of users collectively) to improve trust scores.

In the present disclosure, a machine-learning network (or machine-learning module) may include a set of convolution layers, a set of pooling layers, and/or a set of fully-connected layers. Artificial intelligence may be dependent on building complex machine learning models. A machine learning model may include a set of hyper-parameters. A hyper-parameter may include one or more parameter whose value is pre-determined before the learning/training process may begin. Given a hyper-parameter set for a particular machine learning model, the training algorithm may learn other parameters from the training data or target data. To build a more efficient machine model with high performance, the hyper-parameter set including one or more hyper-parameters may be tuned to optimize the machine-learning network, thus improving its performance. Each set of layers in a machine learning model may include one or more hyper-parameters. For example, the set of convolution layers may include hyper-parameters about kernel size, number of channels, units per layer, padding type, etc. The set of pooling layers may include hyper-parameters for pooling type, filter size, etc. The set of fully-connected layers may include hyper-parameters for units per layer, activation type, dropout rate, etc.

Figure 3B:
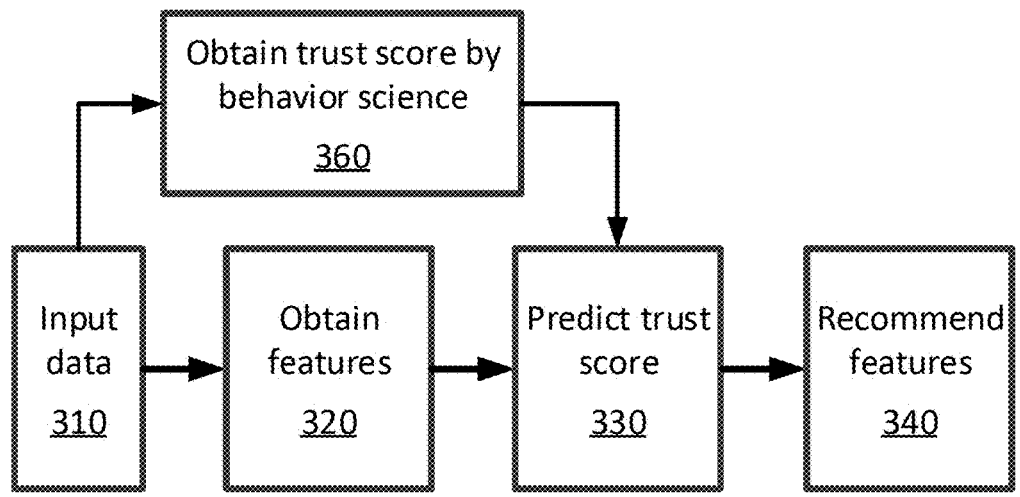
FIG. 3B shows a schematic diagram of another embodiment of the present disclosure.

FIG. 3B shows a system 350 to train the component 330 including a machine-learning network. During training, a type of machine-learning algorithm, a set of hyper parameters, and a set of neural network parameters for the machine-learning network are selected, trained, and/or optimized. A component 360 may be used to obtain a trust score for the input data by behavior science, which may be a human-annotated trust score. The trust scores from 360 may be used as standard trust scores, being compared with a predicted trust score from 330. For a large number of training samples, a mean absolute error (MAE) may be obtained based on the standard trust scores and the predicted trust scores, and the machine-learning network are trained/optimized according to the MAE.

Figure 4:
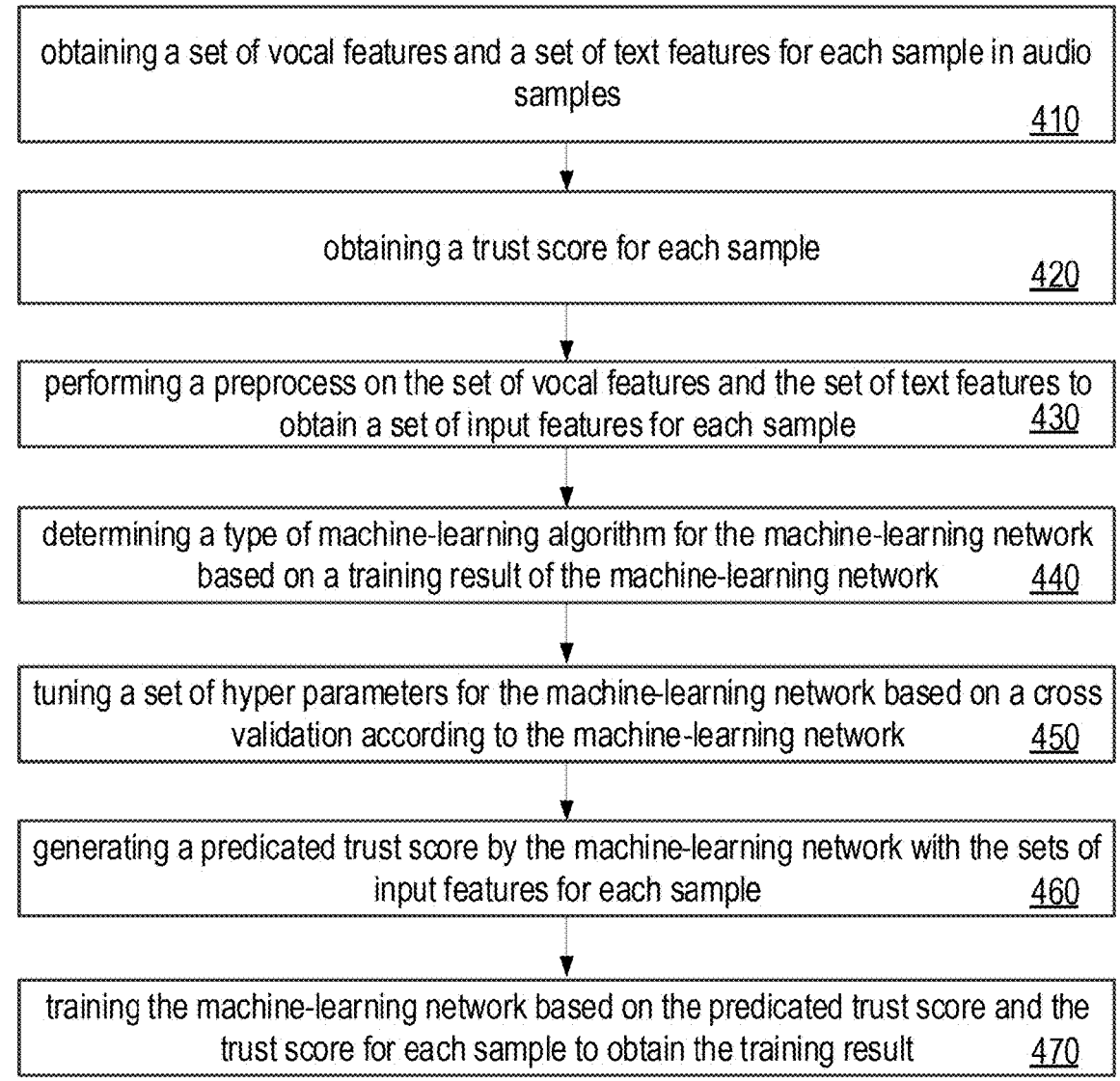
FIG. 4 shows a flow diagram of an exemplary method for using machine learning models to quantify and/or improve trust in conversations.

Referring to FIG. 4, a method may include a portion or all of the following steps, which may be implemented partially or all on a portion or all of components described in FIGS. 1 and 2. Step 410—obtaining a set of vocal features and a set of text features for each sample in audio samples. Step 420—obtaining a trust score for each sample. Step 430—performing a preprocess on the set of vocal features and the set of text features to obtain a set of input features for each sample. Step 440—determining a type of machine-learning algorithm for the machine-learning network based on a training result of the machine-learning network. Step 450—tuning a set of hyper parameters for the machine-learning network based on a cross validation according to the machine-learning network. Step 460—generating a predicated trust score by the machine-learning network with the sets of input features for each sample. Step 470—training the machine-learning network based on the predicated trust score and the trust score for each sample to obtain the training result.

In some implementations, step 410 may include a portion or all of the following: inputting each sample in the audio samples into a transcribe analytics module to obtain a transcribed result for each sample; inputting the transcribed result for each sample into a vocal feature module to obtain the set of vocal features for each sample; and/or inputting the transcribed result for each sample into a text feature module to obtain the set of text features for each sample.

In some implementations, step 430 may include removing correlated features from the set of vocal features and the set of text features to obtain a reduced set of vocal features and a reduced set of text features; and/or encoding categorical variables based on the reduced set of vocal features and the reduced set of text features to obtain the set of input features.

Figure 5:
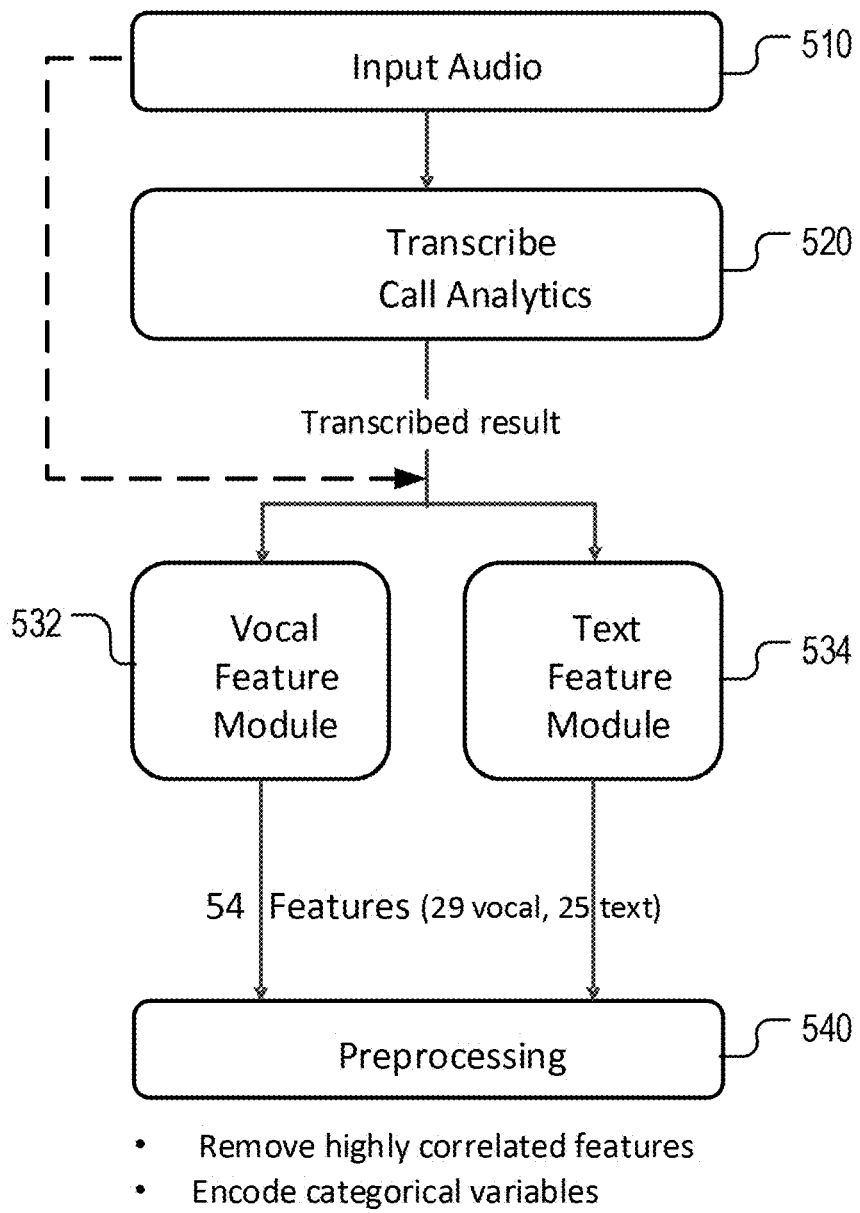
FIG. 5 shows a schematic diagram of an exemplary embodiment of the present disclosure.

FIG. 5 shows a schematic diagram of an exemplary embodiment for obtaining features and preprocessing the features to obtain a set of input features for each sample. A transcribe call analytics model 520 may take an input audio 510 as input and generate a transcribed result, such as a javascript object notation (JSON) output. The JSON output may include at least one of the following: speaker roles, timestamps, transcripts, or the like. The JSON output may be inputted into a vocal feature module 532 to generate a list of vocal features. The JSON output may also be inputted into a test feature module 534 to generate a list of text features. A non-limiting example may include 29 vocal features and 25 text features, so that there are total 54 features. The list of vocal and text features may be preprocessed by a preprocessing module 540 to obtain a set of input features for predicting trust scores. In other implementations, the input audio 510 may be directly inputted into the vocal feature module 532 and the text feature module 534 (as shown by the dashed line).

In some implementations, trust score may be quantified by using textual and voice features by measuring trustworthiness from voice and text analysis. The textual and voice features may include a few categories of features, for example but not limited to, vocal delivery, customer reaction proxy, interaction with customer, and/or message content.

In some implementations, the voice analysis may include the following sub-categories.

One sub-category is sentiment analysis (for agent) including overall sentiment: positive/negative; min/max sentiment score; emotion: 'Happy', 'Sad', 'Angry', etc.; and/or mood: 'reading', 'passionate', etc.

Another sub-category is prosody analysis (for agent) including average words per minute; filler ("uh", "like", etc.) ratio; and/or articulation rate.

Another sub-category is prosody analysis (for customer) including average words per minute; filler ("uh", "like", etc.) ratio; and/or articulation rate.

Another sub-category is sentiment analysis (for customer) including overall sentiment: positive/negative; min/max sentiment score; emotion: 'Happy', 'Sad', 'Angry', etc.; and/or mood: 'reading', 'passionate', etc.

Another sub-category is conversational balance including how long the customer talks compare to the agent.

In some implementations, the text analysis (e.g., natural language processing (NLP)) may include the following sub-categories.

One sub-category is standard linguistic dimensions (for agent and customer) including a number of pronouns; a number of articles; a number of prepositions; a number of past tense verbs; a number of future tense verbs; a number of words; a number of negations; and/or word/phrase embeddings.

Another sub-category is responsiveness (for agent and customer) including interruption frequency; silence frequency; backchannel frequency; and/or nonfluencies.

Another sub-category is named-entity-recognition (for customer) including utterance frequency of: commercial item, person, event, quantity, location, date, and/or title.

Another sub-category is intent and dialogue act classification including intent at utterance level: 'Yes-No-Question', 'Appreciation', 'Open-Question', 'Statement-no-opinion', and/or summarize/reformulate.

Another sub-category is cognitive psychological processes (for agent and customer) including insight, causation, discrepancy, exclusive, tentative, certainty, inhibition, and/or inclusive.

In some implementations, raw data (e.g., audio data) may be processed by voice analysis and text transcript to generate total 68 features. The 68 features may be preprocessed to obtain 57 features by removing metadata (e.g., agent information, etc.), removing highly correlated features, and/or encoding categorical features. The 57 features may be selected to obtain 10 features by choosing top features using importance scores by Lasso or Logistic regression.

Figure 6:
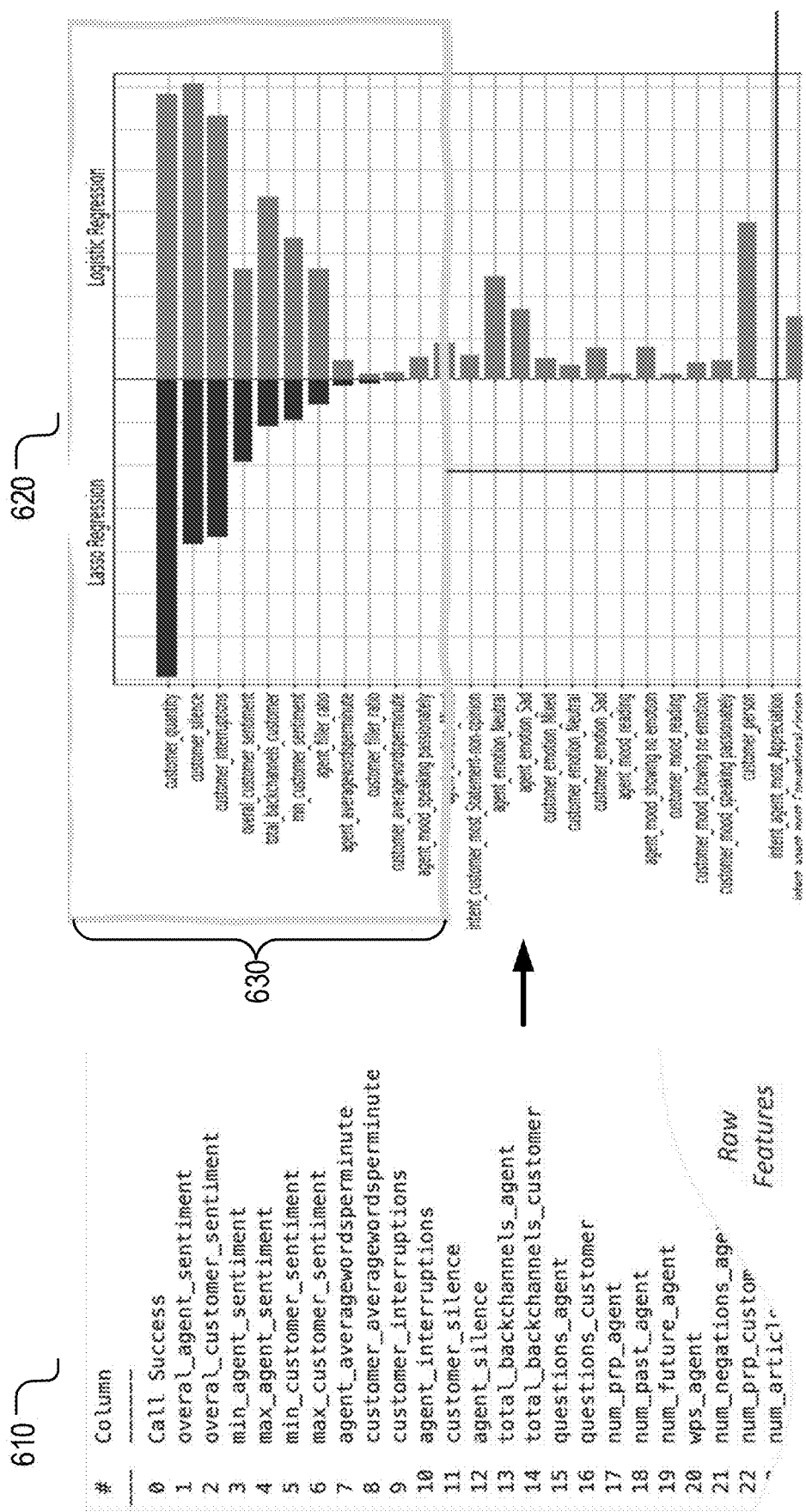
FIG. 6 shows a list of features in an exemplary embodiment of the present disclosure.

In some implementations, a feature selection model may include a classification model to generate a target based on call success (e.g., with a binary outcome). As a non-limiting example in FIG. 6, a list of raw features 610 may be preprocessed and then be fed into a feature selection model to generate a list of feature importance scores 620, wherein the top 10 features 630 with highest feature important scores are selected. In one implementation, a feature selection model trained on 240 samples and tested on 40 hold out samples may achieve 95% accuracy to predict call success. In another implementation, a feature selection model may achieve 93.3% accuracy (±3.4%) on 5-fold cross validation on 280 samples.

In some implementations, the top N features with highest feature important scores may be used to generate a predicated trust score, wherein N is a positive integer and may be 5, 10, 15, and/or 20.

Referring to step 420, the trust score for each sample may be obtained by measuring trust using behavior science. In some implementations, the step 420 may include obtaining a set of scores based on human annotation for each sample, each score in the set of scores corresponding to a variable in a pre-defined trust calculation function; and/or calculating the trust score for each sample based on the pre-defined trust calculation function with the set of scores. In some implementations, the set of scores comprises 4 scores; and the pre-defined trust calculation function comprises 4 variables comprising a credibility variable, a reliability variable, an intimacy variable, and a self-orientation variable. In some implementations, the pre-defined trust calculation function comprises one of the following: (C+R+I)/SO, C+R+I−SO, or C+R+I−3*SO, wherein C is the credibility variable, R is the reliability variable, I is the intimacy variable, and SO is the self-orientation variable.

In some implementations, Charles Green trust quotient may be used to measuring test to obtain trust score. Charles Green trust quotient may include credibility (e.g., words; Can I trust what they say?), reliability (e.g., actions, can I trust what they do?), intimacy (e.g., emotions; Do I feel comfortable around them?), and self-orientation (e.g., motives; What do they care about?). Charles Green trust quotient may measure trust by calculating trust=(credibility+reliability+intimacy)/self-orientation. Charles Green trust quotient may be clear guidelines on evaluating trust; transparent assessment (survey on site); and/or good adoption in the market. Charles Green trust quotient may also be survey-based analysis only; questions framed against individuals, not business entities; and/or some questions not quantifiable.

In some implementations, Blanchard's ABCDs may be used to measuring test to obtain trust score. Blanchard's ABCDs may include able (e.g., capable. Able to the work that needs to be done); believable (e.g., acts with integrity, honest, respectful); connected (e.g., cares about others, listen well, open-minded), and dependable (e.g., do what you say you will do when you say you will do it). Blanchard's ABCDs may provide clear high-level understanding of factors; and/or may include 8-10 checklist of trust actions leaders can work on and follow. Blanchard's ABCDs may also be survey-based research only; and/or framework oriented towards coaching leaders, not evaluating company brands.

In some implementations, Edelman's Brand Trust may be used to measuring test to obtain trust score. Edelman's Brand Trust may include ability (e.g., Is your brand good at what it does?); dependability (e.g., does the brand keep its promises?); integrity (e.g., Is the brand honest?); purpose (e.g., is your brand trying to have a positive social impact?); and self (e.g., does your brand resonate emotionally to audience?). Edelman's Brand Trust may provide clear high-level understanding of factors; may focus on branding trust; Global Trust Barometer Report has insight into consumer trends in trust (e.g. focus on safety, environment, etc.); and/or Edelman's Brand Trust may mix of survey and hard data and analytics. Edelman's Brand Trust may also be survey-based only; and/or assessment not transparent and/or owned by a private company.

As a non-limiting example, Charles Green Trust Quotient may be used to calculate a trust score by a function of 4 variables, and each variable is calculated as a weighted sum of user responses (e.g., between 1 and 4). The credibility variable may be calculated as a weighted sum: Did the agent ensure the customer that they could meet their needs? with a weight of 0.4; and Did the agent discuss their experience successfully helping others in similar situations? with a weight of 0.6. The reliability variable may be calculated as a weighted sum: At the end of the call, did the agent summarize the customer's needs and explain how they will be met? with a weight of 0.5; and Did the agent walk the customer through specific actions that they will take? with a weight of 0.5. The intimacy variable may be calculated as a weighted sum: The agent provided opportunities to connect with the customer? with a weight of 0.6; and Was the customer given the opportunity to expand on what they needed? with a weight of 0.4. The self-orientation variable may be calculated as a weighted sum: Was the scope of the agent's questions too narrow? with a weight of ⅓; Did they frequently interrupt the customer? with a weight of ⅓; and Did they miss opportunities to meet the client's needs? with a weight of ⅓. The trust score may be calculated by one of (C+R+I)/SO, C+R+I−SO, or C+R+I−3*SO, wherein C is the credibility variable, R is the reliability variable, I is the intimacy variable, and SO is the self-orientation variable.

Referring to step 440, the type of machine-learning algorithm may be determined based on the training result of the machine-learning network. A machine-learning algorithm in a machine-learning network may refer to a procedure that is run on data to create the machine-learning network (or model). The machine-learning algorithm may define how the machine-learning network learns: how to perform a pattern recognition, how to learn from training samples/data, and/or how to fit a set of training dataset. There are many types of machine-learning algorithms, such as a gradient boosting, a random forest, a ridge with principal component analysis (PCA), or a linear regression. Each type of machine-learning algorithm may have its particularities and applies to specific situations. In some implementations, the type of machine-learning algorithm for the machine-learning network may be determined as gradient boosting based on a training result of the machine-learning network (e.g., a mean absolute error (MAE)).

Referring to step 450, the set of hyper parameters comprises at least one of the following: a learning rate, a minimum sample split, a minimum sample leaf, or a number of estimators. In some implementations, the set of hyper parameters may also include at least one of the following: a number of convolution layers; a number of pooling layers; a number of fully-connected layers; for one or more convolution layer, kernel size, number of channels, units per layer, padding type, etc.; for one or more pooling layers, pooling type, filter size, etc.; and/or for one or more fully-connected layers, units per layer, activation type, dropout rate, etc.

Referring to step 460, the machine-learning network may generate a predicated trust score for each sample.

Referring to step 470, the training result comprises a mean absolute error (MAE) between the predicated trust score and the trust score for each sample. The step 470 may include train the machine-learning network based on the predicated trust score and the trust score for each sample to minimize the MAE based on a gradient boosting regressor.

In some implementations, in comparison to the standard trust scores obtained by using behavior science methods, the MAE of 1.85 may be achieved for testing on 100 hold out set. In some implementations, the machine-learning network may generate feature importance scores for each feature, and then generate a sorted list of features based on their individual importance scores.

In some implementations, the machine-learning network may generate one or more trust components. As a non-limiting example, the machine-learning network may generate 4 trust components corresponding to the 4 factors (variables) in Charles Green Trust Quotient. The predicated trust score may be calculated by one of (C+R+I)/SO, C+R+I−SO, or C+R+I−3*SO, wherein C is the credibility variable, R is the reliability variable, I is the intimacy variable, and SO is the self-orientation variable.

Figure 7:
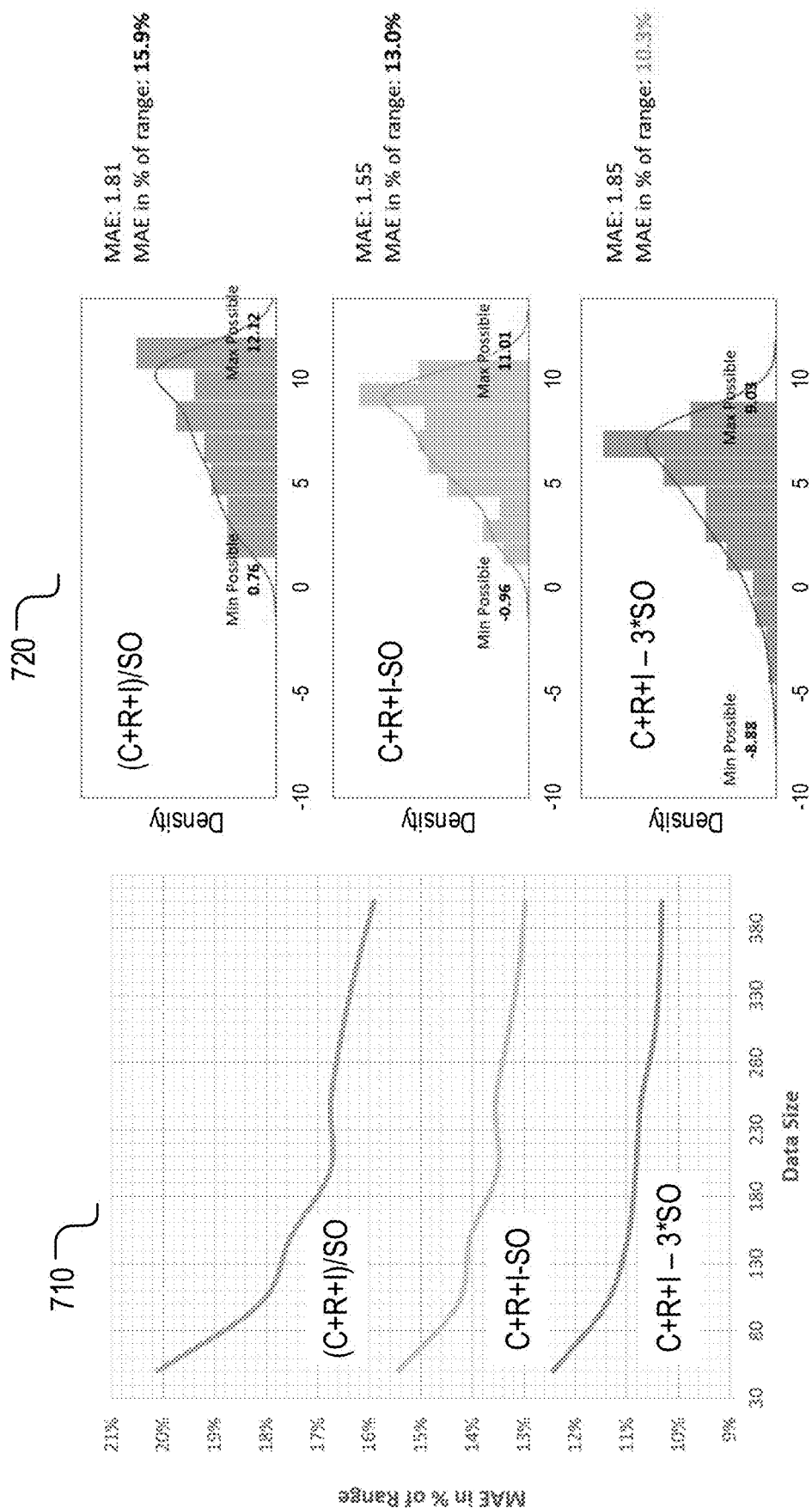
FIG. 7 shows various learning curves and histograms in various exemplary embodiments of the present disclosure.

Referring to FIG. 7, in an exemplary embodiment, several learning curves 710 during trains for the machine-learning network corresponds to different trust score functions. The learning curve (i.e., the bottom curve in 710) for the function of C+R+I−3*SO yields the smallest MAE for a same number of data size. Several density histograms 720 for the machine-learning network with 400 training samples and 100 test samples correspond to the calculated trust score for different trust score functions.

Optionally, various embodiments may include generating a list of recommended features to improve trust scores. A user or a group of users may improve their trust delivery by taking the recommended trainings to address the component affecting the overall trust score. Optionally, in some embodiments, to further provide automation, one or more participant may be replaced by a digital avatar, which may delivery trustworthy interactions in all situations.

In various embodiments, the method 400 may optionally include a portion or all of the following: generating a set of trust components for a user by the machine-learning network; concatenating the set of trust components with a user profile of the user to obtain an expanded user profile; inputting the expanded user profile into a second machine-learning network trained to recommend features for improving trust scores; and/or generating a list of recommended features for the user by the second machine-learning network based on the expanded user profile.

In some implementations, the list of recommended features comprises features from a recommendation library; the second machine-learning network comprises a softmax module for training and a nearest neighbor index module to generate a recommendation probability for each feature in the recommendation library; and/or the list of recommended features comprises top N features with highest recommendation probability, N being a positive integer.

In some implementations, the recommendation library may be referred as a training library, including a list of training items for each issue identified as a source to affect the trust score. As an un-limiting example, the training library may be constructed to address at least one of the following issues: low intimacy, low credibility, low reliability, and/or high self-orientation.

In some implementations, to improve trust scores due to the issue of low intimacy, the recommendation library (or training library) may include at least one of the following features (or training items): acknowledge customer emotions, including positive/negative emotions and sense of urgency expressed; use similar language styles as the customer; express ownership of client's role in the issue resolution, including using "We" statements, and avoid blaming others; and/or show customer you understood the request by rephrasing issue to confirm understanding and by asking clarifying questions.

In some implementations, to improve trust scores due to the issue of low credibility, the recommendation library (or training library) may include at least one of the following features (or training items): establish context with customer, including using their name and providing information about the issue/problem; reduce grammar and punctuation mistakes; avoid showing personal feelings or frustration about the issue that would represent client as a negative brand and may encourage customer's frustration; do not share unnecessary internal information, including internal team nomenclature and sensitive information; explain the root cause of the customer's issue; and/or attempt to troubleshoot the issue before escalating, and if escalation is needed, then ensure it is concise and contains all needed information including error codes and screenshots.

In some implementations, to improve trust scores due to the issue of low reliability, the recommendation library (or training library) may include at least one of the following features (or training items): provide a recap of next steps and expected outcomes; set realistic expectations on task/escalation timelines and scope of actions; verify that the resolution was successful and provide appropriate farewell; and/or follow through on all commitments made during the case.

In some implementations, to improve trust scores due to the issue of high self-orientation, the recommendation library (or training library) may include at least one of the following features (or training items): reduce need for client to repeat requests or re-share information; and/or address all questions with clear explanations.

Figure 8:
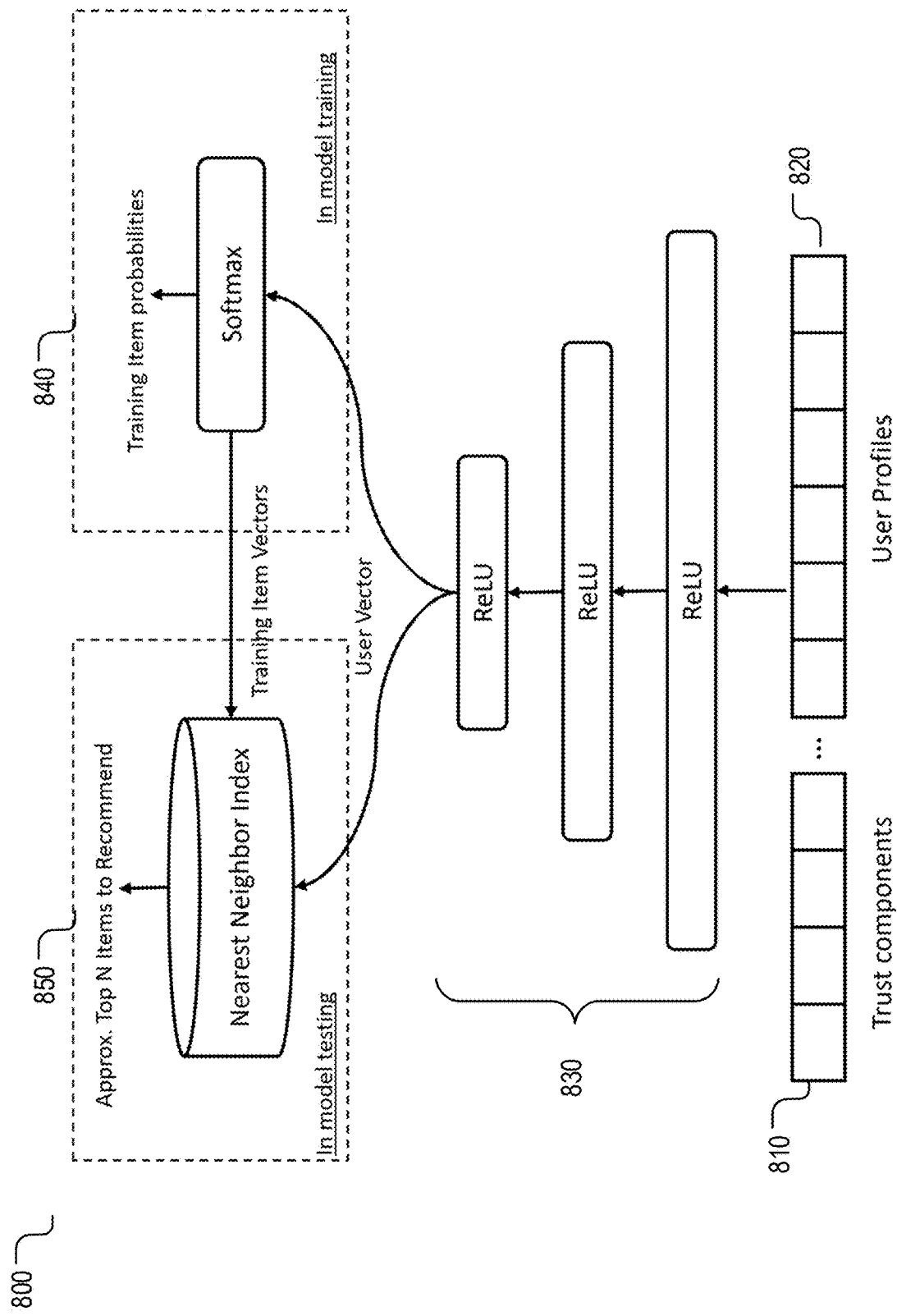
FIG. 8 shows a schematic diagram of an exemplary embodiment of the present disclosure.

FIG. 8 shows a schematic diagram of an exemplary embodiment of a system 800 for recommending personalized training for a user (or a group of users). The system 800 may take an input including trust components 810 and user profiles 820 for a user (or a group of users), which may be concatenated as the input. In some implementations, the trust components may include scores for intimacy, credibility, reliability, and self-orientation; and/or the user profiles may include age, gender, language embeddings, location embeddings, etc.

The system 800 may include a machine-learning network including at least one or more rectified linear unit (ReLU) layer 830. In some implementations, a ReLU layer may output the input directly if it is positive, otherwise, it may output zero.

The system 800 may include a softmax module 840 for in model training. In some implementations, the softmax module may include an activation function to predict a multinomial probability distribution; and/or may be used for multi-class classification problems where class membership is required on more than two class labels. The softmax module may receive one or more user vector from the ReLU layer; may generate and output a list of predicated probabilities for the training items in the training library; and/or may generate and output one or more training item vector to a nearest neighbor lookup module 850. The system 800 may be trained based on error function between the list of predicated probabilities for the training items and the list of true probabilities for training items for the user (or the group of users). As an non-limiting example, a training library has 5 training items, and an expert analysis produces the second training item in the training library is the recommended item (feature). Thus, the list of true probabilities is (0, 1, 0, 0, 0). When the list of predicated probabilities is (0, 0, 1, 0, 0), the cross-entropy loss is calculated and minimized with gradient descent based on the list of predicated probabilities and the list of true probabilities. The training item vector may have a same number of dimensions as the number of training items in the training library.

The system 800 may include a nearest neighbor index module 850 for in model testing. The nearest neighbor index module 850 may receive training item vectors from the softmax module and/or one or more user vector from the ReLU layer. In some implementations, the user vector may have a same number of dimensions as the number of training items in the training library. The nearest neighbor index module 850 may generate and output top N items for personalized training recommendation.

In some embodiments, the recommendation problem may be addressed as an extreme multiclass classification where the prediction problem becomes accurately predict a specific training item $t_i$ from training library T based on Trust Components C and User Profiles P, $$P(t_i \mid C, P) = \frac{e^{v_i \cdot u}}{\sum_{j \in T} v_j \cdot u},$$

where u represents a high-dimensional "embedding" of the user. In this setting, an embedding is simply a mapping of sparse entities (users, language, locations etc.) into a dense vector. The task of the deep neural network is to learn user embeddings u as a function of the trust components and user profiles, which are useful for discriminating among training items with a softmax classifier.

In some implementations, an explicit feedback from the user may be used to train the model, where a user chooses one item (positive samples) over other suggested items (negative samples). In some implementations, implicit feedback may be used instead. In model training, a cross-entropy loss is minimized with gradient descent on the output of the sampled softmax. In model testing, an approximate nearest neighbor lookup is performed to generate top N items for personalized training recommendation.

Optionally, various embodiments may include automating trust delivery with digital avatar, including an artificial intelligence powered avatar to provide trustworthy conversations.

Figure 9:
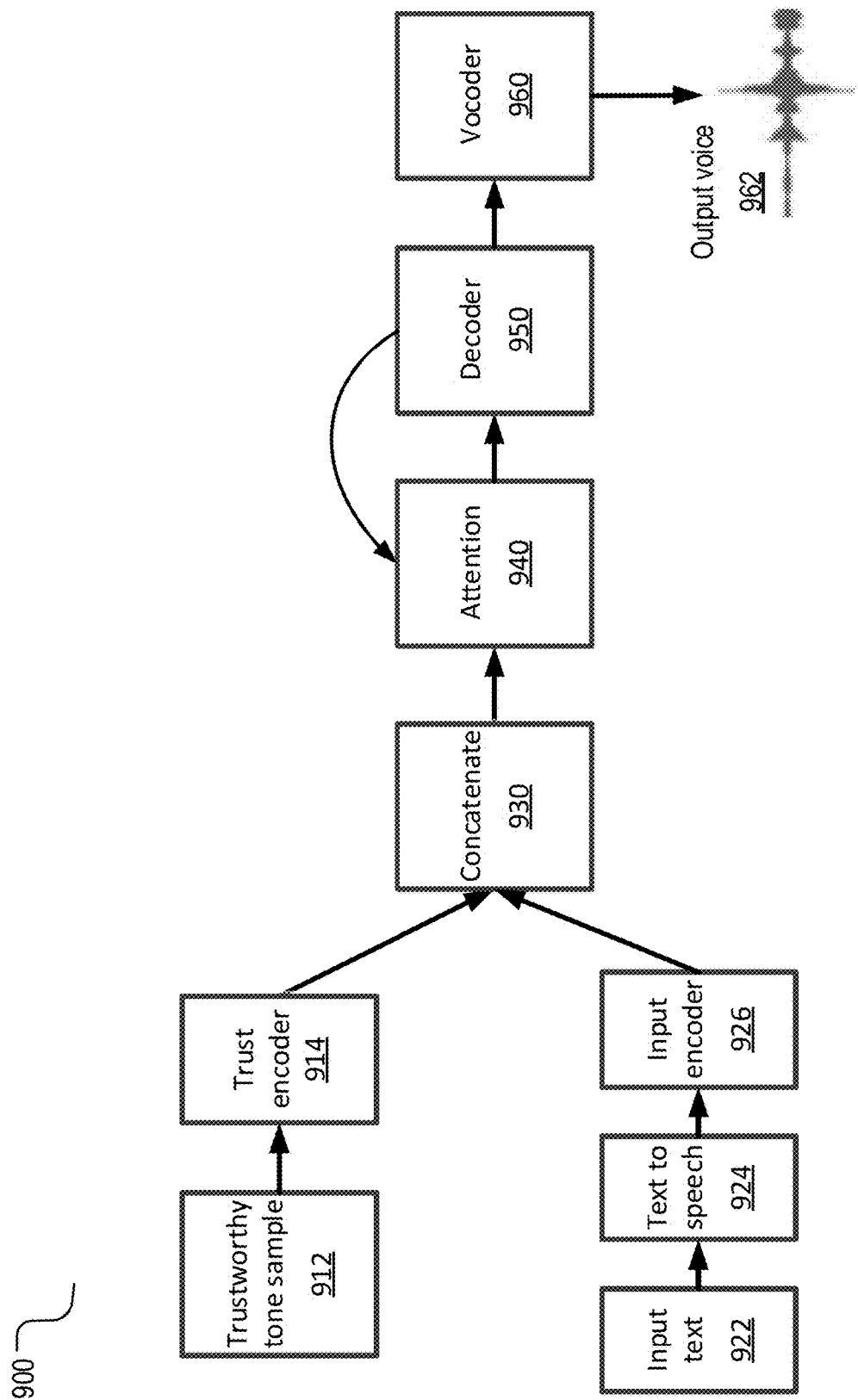
FIG. 9 shows a schematic diagram of an exemplary embodiment for an avatar voice generation of the present disclosure.

FIG. 9 shows a schematic diagram of an exemplary embodiment of an avatar voice generation system 900 for generating a trustworthy voice 962 based on an input text 922 and a reference trustworthy tone sample 912. The system 900 may include a portion or all of the following: a trust encoder 914, a text to speech module 924, an input encoder 926, a concatenate module 930, an attention layer 940, a decoder 950, and/or a vocoder 960. In some implementations, a sequence of phonemes and Mel spectrogram of applying text to speech are collected on input text. The spectrogram is passed to the input encoder to generate an input embedding. The trust encoder encodes the reference tone sample and concatenates with input encoding. A new Mel spectrogram is generated by a decoder 950 with attention 940. This attention network 940 is built to be location-sensitive by using cumulative attention weights from previous decoder time steps as an additional feature. Attention probabilities are computed after projecting inputs and location features to low-dimensional hidden representations. Location features are computed using 1-D convolution filters. The decoder 950 is an autoregressive recurrent neural network which predicts a Mel spectrogram from the encoded input sequence one frame at a time. The output voice is generated by a vocoder on the Mel spectrogram.

Figure 10:
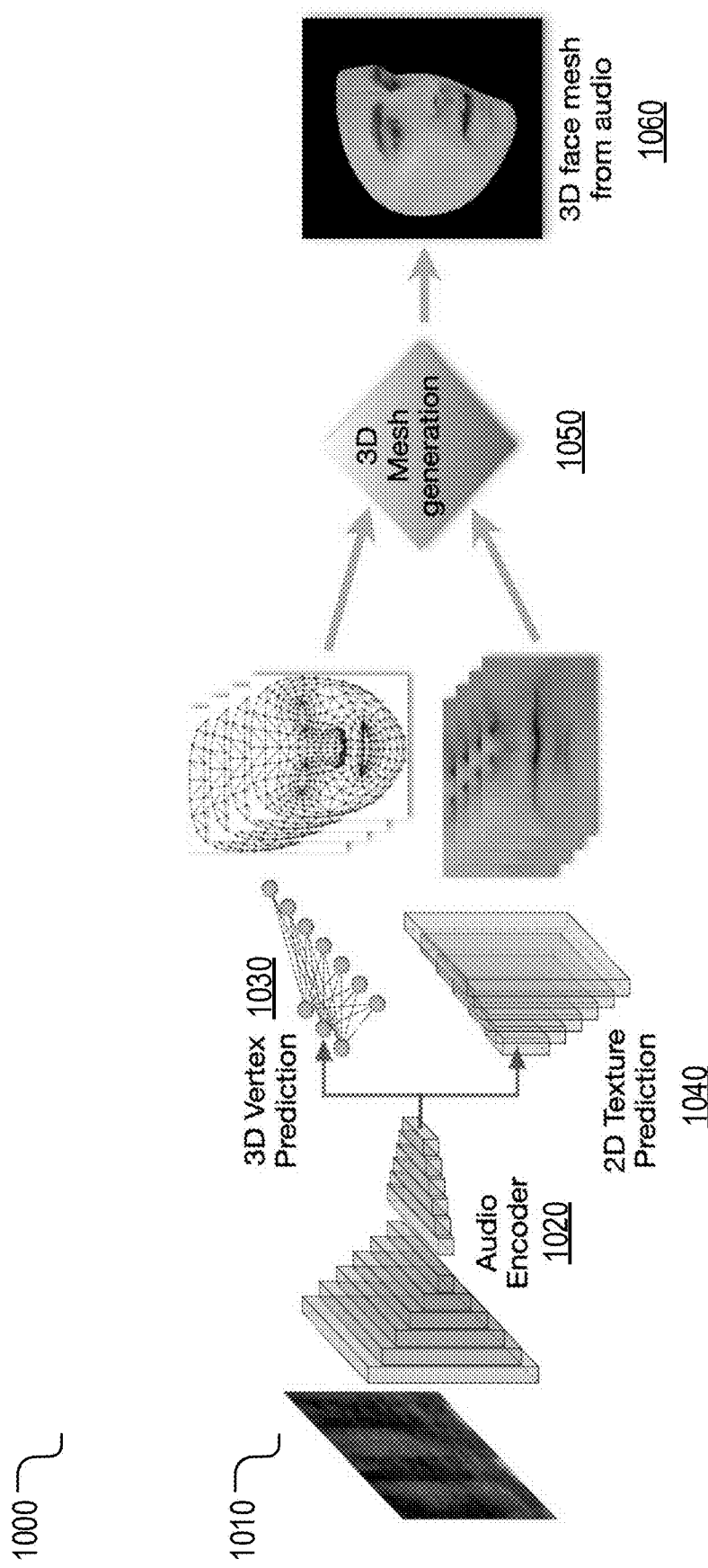
FIG. 10 shows a schematic diagram of an exemplary embodiment for an avatar face generation of the present disclosure.

FIG. 10 shows a schematic diagram of an exemplary embodiment of an avatar face generation system 1000 for generating a three-dimension (3D) face mesh 1060 based on an input audio 1010. In some implementations, the input audio 1010 may be the trustworthy voice 962 in FIG. 9. The system 1000 may include a portion or all of the following: an audio encoder 1020, a 3D vertex prediction 1030, a 2D texture prediction 1040, and/or a 3D mesh generator 1050. The avatar face generation system may predict geometry and texture from audio input. It extracts the audio channel from the training video and transforms into Mel spectrograms as an input. The training outputs are generated by a 3D face landmark detector with fixed topology. The predicted vertices may be projected onto the reference cylinder, and use the resulting 2D locations as texture coordinates to convert it to a textured 3D mesh. Since the predicted texture atlas is defined on the same cylindrical domain, it is consistent with the computed texture coordinates. The result of the avatar face generation system 1000 is a fully textured 3D face mesh, driven by audio input.

Figure 11:
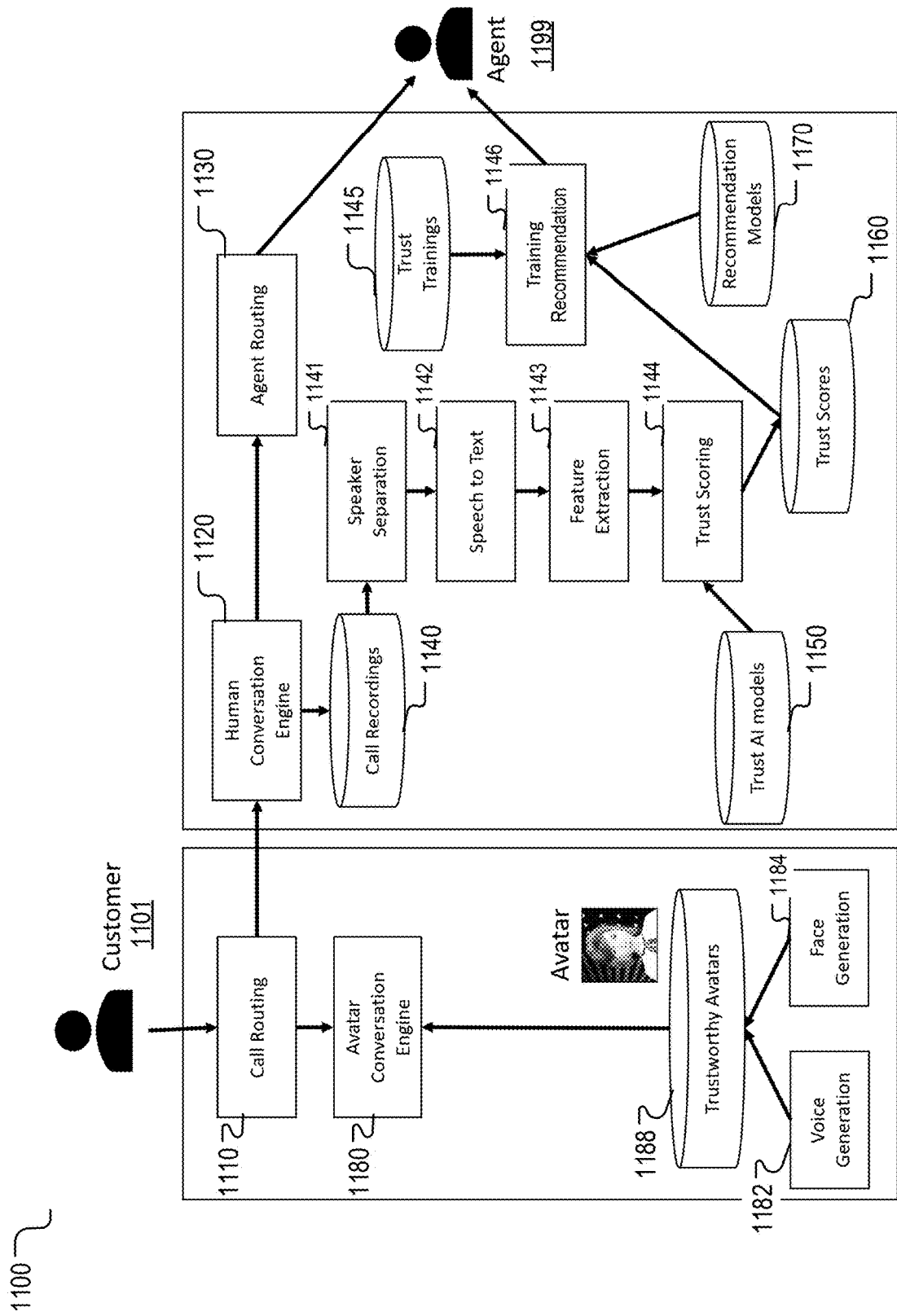
FIG. 11 shows a schematic diagram of an exemplary embodiment of the present disclosure.

FIG. 11 shows a schematic diagram of an exemplary embodiment of an overall system 1100 for providing an objective, reproducible, and/or automated way for trust management in conversations. In some implementations, the system 1100 may be used in a call center to answer inquiries from one or more customer 1101 by one or more agent 1199. The trust of call center's agents may need improvement, and/or the digital avatar 1188 may be implemented to perform some of the work of the call center's agents. The system 1100 may include a portion or all of the following: a call routing module 1110, an avatar conversation engine 1180, one or more trustworthy avatars 1188, a voice generation module 1182, a face generation module 1184, a human conversation engine 1120, an agent routing module 1130, a call recording module 1140, a speaker separation module 1141, a speech to text module 1142, a feature extraction module 1143, a trust scoring module 1144, a rust training module 1145, a training recommendation 1146, one or more trust AI model 1150, a trust score storage 1160, and/or one or more recommendation model 1170.

In some implementations, when a customer 1101 contacts a call center, the call routing module 1110 may determine whether to have the customer connecting with a human conversation engine 1120 or an avatar conversation engine 1180.

When the call routing module determines the customer to connect with a human conversation engine, the customer may have conversation with a determined agent 1199 after the agent routing module 1130 determines which agent to have conversation with the customer. The human conversation engine may send the conversation to call recording module for recording, and the recording or the live conversation may be processed to obtain a trust scores and/or be processed to generate a recommendation for improvement.

When the call routing module determines the customer to connect with a avatar conversation engine, the customer may have conversation with a trustworthy avatar 1188. The avatar 1188 may be an avatar with voice capability only, or may be an avatar with both voice and facial expression capability. The avatar 1188 may include a voice generation module 1182 to generate voice based on auto-generated text and a reference trustworthy tone sample, and/or a face generation module 1184 to generate 3D face mesh based on the generated voice.

In the present disclosure, some figures may show a schematic representation of a neural network, which serves as an illustrative representation and does not impose limitations to the neural network. For example, the neural network may include one or more AI machine learning techniques/networks, including but not limited to, a k-means, a term frequency-inverse document frequency (TF-IDF), a random forest, a deep neural network (DNN), and/or a recurrent neural network (RNN). For another example, the architecture of the neural network is not limited to the representation shown in the figures, for example, the sequence/order of various layers and/or a number of types of layers (e.g., convolutional layers, pooling layers, fully-connected layers, etc.).

In the present disclosure, when applicable, an entire system or one or more component/module of the system may include one or more AI machine learning techniques/networks, including but not limited to, a k-means, a term frequency-inverse document frequency (TF-IDF), a random forest, a deep neural network (DNN), and/or a recurrent neural network (RNN).

In the present disclosure, a module may refer to a software module, a hardware module, or a combination thereof. A software module may include a computer program or part of the computer program that has a predefined function and works together with other related parts to achieve a pre-defined goal, such as those functions described in this disclosure. A hardware module may be implemented using processing circuitry and/or memory configured to perform the functions described in this disclosure. Each module can be implemented using one or more processors (or processors and memory). Likewise, a processor (or processors and memory) can be used to implement one or more modules. Moreover, each module can be part of an overall module that includes the functionalities of the module. The description here also applies to the term module and other equivalent terms.

In the present disclosure, an entire system or one or more component of the system may include one or more software unit, one or more hardware unit, or a combination thereof. A software unit may include a computer program or part of the computer program that has a predefined function and works together with other related parts to achieve a pre-defined goal, such as those functions described in this disclosure. A hardware unit may be implemented using processing circuitry and/or memory configured to perform the functions described in this disclosure. Each unit can be implemented using one or more processors (or processors and memory). Likewise, a processor (or processors and memory) can be used to implement one or more units. Moreover, each unit can be part of an overall unit that includes the functionalities of the unit. The description here also applies to the term unit and other equivalent terms.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be stored in a tangible storage medium that is other than a transitory signal, such as a flash memory, a random access memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed as circuitry among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

While the particular disclosure has been described with reference to illustrative embodiments, this description is not meant to be limiting. Various modifications of the illustrative embodiments and additional embodiments of the disclosure will be apparent to one of ordinary skill in the art from this description. Those skilled in the art will readily recognize that these and various other modifications can be made to the exemplary embodiments, illustrated and described herein, without departing from the spirit and scope of the present disclosure. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

What is claimed is:

1. A system comprising:
a non-transitory memory storing instructions executable to construct a machine learning network to quantify a trust score and to automate trust delivery with a digital avatar by generating a trustworthy voice for the digital avatar; and
a processor in communication with the non-transitory memory, wherein, the processor executes the instructions to cause the system to:
obtain a set of vocal features and a set of text features for each sample in audio samples;
obtain a trust score for each sample;
perform a preprocess on the set of vocal features and the set of text features to obtain a set of input features for each sample;
determine a type of machine-learning algorithm for the machine-learning network based on a training result of the machine-learning network;
tune a set of hyper parameters for the machine-learning network based on a cross validation according to the machine-learning network;

generate a predicated trust score by the machine-learning network with the sets of input features for each sample;
train the machine-learning network based on the predicated trust score and the trust score for each sample to obtain the training result;
generate a set of trust components for a user by the machine-learning network;
concatenate the set of trust components with a user profile of the user to obtain an expanded user profile;
train a second machine-learning network by input the expanded user profile to recommend features for improving trust scores; and
generate a list of recommended features for the user by the trained second machine learning network based on the expanded user profile,
wherein generating the trustworthy voice for the digital avatar comprises:
receiving an input text and a reference trustworthy tone sample;
collecting a sequence of phonemes and a Mel spectrogram from the input text using a text to speech module;
encoding the Mel spectrogram with an input encoder to generate an input embedding;
encoding the reference trustworthy tone sample with a trust encoder and concatenating with the input embedding to generate an output;
processing the output of the concatenation through a location-sensitive attention layer using cumulative attention weights to generate an encoded input sequence;
predicting a Mel spectrogram with a decoder from the encoded input sequence; and
generating the trustworthy voice for the digital avatar from the Mel spectrogram using a vocoder, wherein the digital avatar is configured to replace the user in a conversation.

2. The system according to claim 1, wherein the instructions to cause the system to obtain the set of vocal features and the set of text features for each sample in the audio samples, comprises instructions to cause the system to:
input each sample in the audio samples into a transcribe analytics module to obtain a transcribed result for each sample;
input the transcribed result for each sample into a vocal feature module to obtain the set of vocal features for each sample; and
input the transcribed result for each sample into a text feature module to obtain the set of text features for each sample.

3. The system according to claim 1, wherein the instructions to cause the system to obtain the trust score for each sample, comprises the instructions to cause the system to:
obtain a set of scores based on human annotation for each sample, each score in the set of scores corresponding to a variable in a pre-defined trust calculation function; and
calculate the trust score for each sample based on the pre-defined trust calculation function with the set of scores.

4. The system according to claim 3, wherein:
the pre-defined trust calculation function comprises a plurality of variables comprising a credibility variable, a reliability variable, an intimacy variable, and a self-orientation variable.

5. The system according to claim 4, wherein:
the pre-defined trust calculation function comprises one of the following:
a summation of the credibility variable, the reliability variable, and the intimacy variable, the summation being divided by the self-orientation variable;
the summation of the credibility variable, the reliability variable, and the intimacy variable, the summation being subtracted by the self-orientation variable; or
the summation of the credibility variable, the reliability variable, and the intimacy variable, the summation being subtracted by three times the self-orientation variable.

6. The system according to claim 1, wherein the instructions to cause the system to perform the preprocess on the set of vocal features and the set of text features to obtain the set of input features for each sample, comprises the instructions to cause the system to:
remove correlated features from the set of vocal features and the set of text features to obtain a reduced set of vocal features and a reduced set of text features; and
encode categorical variables based on the reduced set of vocal features and the reduced set of text features to obtain the set of input features.

7. The system according to claim 1, wherein the type of machine-learning algorithm comprises one of a gradient boosting, a random forest, a ridge with principal component analysis (PCA), or a linear regression.

8. The system according to claim 1, wherein the set of hyper parameters comprises at least one of a learning rate, a minimum sample split, a minimum sample leaf, or a number of estimators.

9. The system according to claim 1, wherein:
the training result comprises a mean absolute error (MAE) between the predicated trust score and the trust score for each sample; and
the instructions to cause the system to train the machine-learning network based on the predicated trust score and the trust score for each sample, comprises the instructions to cause the system to:
train the machine-learning network based on the predicated trust score and the trust score for each sample to minimize the MAE based on a gradient boosting regressor.

10. The system according to claim 1, wherein:
the list of recommended features comprises features from a recommendation library;
the second machine-learning network comprises a softmax module for training and a nearest neighbor index module to generate a recommendation probability for each feature in the recommendation library; and
the list of recommended features comprises top N features with highest recommendation probability, N being a positive integer.

11. A method comprising:
obtaining, by a computing device comprising a memory storing instructions executable to construct a machine-learning network to quantify a trust score and to automate trust delivery with a digital avatar by generating a trustworthy voice for the digital avatar and a processor in communication with the memory, a set of vocal features and a set of text features for each sample in audio samples;
obtaining, by the computing device, a trust score for each sample;
performing, by the computing device, a preprocess on the set of vocal features and the set of text features to obtain a set of input features for each sample;

determining, by the computing device, a type of machine-learning algorithm for the machine-learning network based on a training result of the machine-learning network;
tuning, by the computing device, a set of hyper parameters for the machine learning network based on a cross validation according to the machine-learning network;
generating, by the computing device, a predicated trust score by the machine learning network with the sets of input features for each sample;
training, by the computing device, the machine-learning network based on the predicated trust score and the trust score for each sample to obtain the training result;
generating a set of trust components for a user by the machine-learning network;
concatenating the set of trust components with a user profile of the user to obtain an expanded user profile;
training a second machine-learning network by inputting the expanded user profile to recommend features for improving trust scores; and
generating a list of recommended features for the user by the trained second machine learning network based on the expanded user profile,
wherein generating the trustworthy voice for the digital avatar comprises:
receiving an input text and a reference trustworthy tone sample;
collecting a sequence of phonemes and a Mel spectrogram from the input text using a text to speech module;
encoding the Mel spectrogram with an input encoder to generate an input embedding;
encoding the reference trustworthy tone sample with a trust encoder and concatenating with the input embedding to generate an output;
processing the output of the concatenation through a location-sensitive attention layer using cumulative attention weights to generate an encoded input sequence;
predicting a Mel spectrogram with a decoder from the encoded input sequence; and
generating the trustworthy voice for the digital avatar from the Mel spectrogram using a vocoder, wherein the digital avatar is configured to replace the user in a conversation.

12. The method according to claim 11, wherein obtaining the set of vocal features and the set of text features for each sample in the audio samples comprises:
inputting each sample in the audio samples into a transcribe analytics module to obtain a transcribed result for each sample;
inputting the transcribed result for each sample into a vocal feature module to obtain the set of vocal features for each sample; and
inputting the transcribed result for each sample into a text feature module to obtain the set of text features for each sample.

13. The method according to claim 11, wherein obtaining the trust score for each sample comprises:
obtaining a set of scores based on human annotation for each sample, each score in the set of scores corresponding to a variable in a pre-defined trust calculation function; and
calculating the trust score for each sample based on the pre-defined trust calculation function with the set of scores.

14. The method according to claim 13, wherein:
the pre-defined trust calculation function comprises a plurality of variables comprising a credibility variable, a reliability variable, an intimacy variable, and a self-orientation variable.

15. A product comprising:
machine-readable media other than a transitory signal;
instructions stored on the machine-readable media for constructing a machine learning network to quantify a trust score and to automate trust delivery with a digital avatar by generating a trustworthy voice for the digital avatar; and
wherein when a processor executes the instructions, the product is configured to:
obtain a set of vocal features and a set of text features for each sample in audio samples;
obtain a trust score for each sample;
perform a preprocess on the set of vocal features and the set of text features to obtain a set of input features for each sample;
determine a type of machine-learning algorithm for the machine-learning network based on a training result of the machine-learning network;
tune a set of hyper parameters for the machine-learning network based on a cross validation according to the machine-learning network;
generate a predicated trust score by the machine-learning network with the sets of input features for each sample;
train the machine-learning network based on the predicated trust score and the trust score for each sample to obtain the training result;
generate a set of trust components for a user by the machine-learning network;
concatenate the set of trust components with a user profile of the user to obtain an expanded user profile;
train a second machine-learning network by input the expanded user profile to recommend features for improving trust scores; and
generate a list of recommended features for the user by the trained second machine learning network based on the expanded user profile,
wherein generating the trustworthy voice for the digital avatar comprises:
receiving an input text and a reference trustworthy tone sample;
collecting a sequence of phonemes and a Mel spectrogram from the input text using a text to speech module;
encoding the Mel spectrogram with an input encoder to generate an input embedding;
encoding the reference trustworthy tone sample with a trust encoder and concatenating with the input embedding to generate an output;
processing the output of the concatenation through a location-sensitive attention layer using cumulative attention weights to generate an encoded input sequence;
predicting a Mel spectrogram with a decoder from the encoded input sequence; and
generating the trustworthy voice for the digital avatar from the Mel spectrogram using a vocoder, wherein the digital avatar is configured to replace the user in a conversation.

16. The product according to claim 15, wherein, when the product is configured to obtain the set of vocal features and the set of text features for each sample in the audio samples, the product is configured to:

input each sample in the audio samples into a transcribe analytics module to obtain a transcribed result for each sample;

input the transcribed result for each sample into a vocal feature module to obtain the set of vocal features for each sample; and input the transcribed result for each sample into a text feature module to obtain the set of text features for each sample.

17. The product according to claim 15, wherein, when the product is configured to obtain the trust score for each sample, the product is configured to:

obtain a set of scores based on human annotation for each sample, each score in the set of scores corresponding to a variable in a pre-defined trust calculation function; and calculate the trust score for each sample based on the pre-defined trust calculation function with the set of scores.

\* \* \* \* \*